United States Patent
Kahlon et al.

(12) 
(10) Patent No.: US 6,322,476 B1
(45) Date of Patent: Nov. 27, 2001

(54) METHOD AND APPARATUS TO PROVIDE POWER ASSISTANCE TO AN ENGINE WITH A STARTER ALTERNATOR DURING GEAR SHIFTS

(75) Inventors: Gurinder S. Kahlon, Canton; Ning Liu, Ypsilanti; Robert Mohan, Canton, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 2 days.

(21) Appl. No.: 09/597,447

(22) Filed: Jun. 20, 2000

(51) Int. Cl.⁷ .................................................. B60K 1/02
(52) U.S. Cl. ...................................... 477/3; 477/5
(58) Field of Search ................................ 477/3, 5

(56) References Cited

U.S. PATENT DOCUMENTS

| | | | |
|---|---|---|---|
| 4,533,011 | * 8/1985 | Heidemeyer et al. | 180/65.2 |
| 5,337,848 | * 8/1994 | Bader | 180/65.2 |
| 6,090,007 | * 7/2000 | Nakajima et al. | 477/46 |

\* cited by examiner

*Primary Examiner*—Dirk Wright
(74) *Attorney, Agent, or Firm*—Mark L. Mollon

(57) ABSTRACT

A system (40) for an automotive vehicle (10) has an internal combustion engine (12) having a crankshaft (50) and a starter/alternator (42) coupled to the crankshaft (50). A transmission (26) is coupled to the starter/alternator (42). A gear position sensor (70) coupled to the transmission (26) generates a gear change signal. A controller (54) is coupled to the starter/alternator (42) and the gear position sensor (70) and receives the gear change signal. The controller (54) initiates the operation of the starter/alternator (42) as a motor to provide a predetermined torque.

12 Claims, 1 Drawing Sheet

METHOD AND APPARATUS TO PROVIDE POWER ASSISTANCE TO AN ENGINE WITH A STARTER ALTERNATOR DURING GEAR SHIFTS

TECHNICAL FIELD

The present invention relates generally to internal combustion engines for automotive vehicles, and more specifically, to an automotive vehicle having a starter/alternator coupled to the engine.

BACKGROUND

Automotive vehicles with internal combustion engines are typically provided with both a starter motor and alternator. In recent years, a combined alternator and starter motor has been proposed. Such systems have a rotor mounted directly to the crankshaft of the engine and a stator sandwiched between the engine block and the bell housing of the transmission. During initial startup of the vehicle, the starter/alternator functions as a starter. While functioning as a starter, the starter/alternator provides a sufficient amount of starting torque to rotate the crankshaft of the engine before the cylinders are fired. After the engine is fired, an amount of engine torque is provided to the crankshaft from the combustion process in the cylinders. After the engine is started, the starter/alternator is used as a generator to charge the electrical system of the vehicle.

As the vehicle is traveling, the transmission changes gears to prove a predetermined ratio between the engine and powered wheels of the vehicle. Also, when quick acceleration is desired, engine speed (RPMs) typically increase slowly and thus power output increases slowly. Thus, during gear change to obtain a desired quick acceleration, the engine torque may not be sufficient to provide desired acceleration. Because the power output is slow to match the desired power, noise, vibration and harshness (NVH) increases during such times. Automakers are constantly striving to reduce undesirable NVH.

It would therefore be desirable to provide increased power or decreased power to control speed and reduce the NVH during gear shifts.

SUMMARY OF THE INVENTION

It is therefore one object of the invention to provide increased power during gearshifts to provide smoother acceleration, and power assist to the engine.

In one aspect of the invention, an internal combustion engine has a starter/alternator coupled to the crankshaft of the engine. A method of controlling the starter/alternator comprises the steps of:

sensing a gear shift change;

rotating the crankshaft of the engine with the starter/alternator in response to the gear shift change;

increasing or decreasing a torque of the starter to a predetermined torque; and thereby, increasing or decreasing an engine torque.

In a further aspect of the invention, a system for an automotive vehicle has an internal combustion engine having a crankshaft and a starter/alternator coupled to the crankshaft. A transmission is coupled to the starter/alternator. A gear position sensor coupled to the transmission generates a gear change signal. A controller is coupled to the starter/alternator and the gear position sensor and receives the gear change signal. The controller initiates the operation of the starter/alternator as a motor or generator to provide a predetermined torque.

One advantage of the present invention is that a higher torque during a gear shift is generated so that more rapid acceleration may be obtained. Another advantage of the invention is that clutch wear during a gear change may be reduced because both sides of the clutch are being powered. Yet another advantage of the invention is that the size of the engine may be reduced while still providing desirable acceleration or deceleration.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
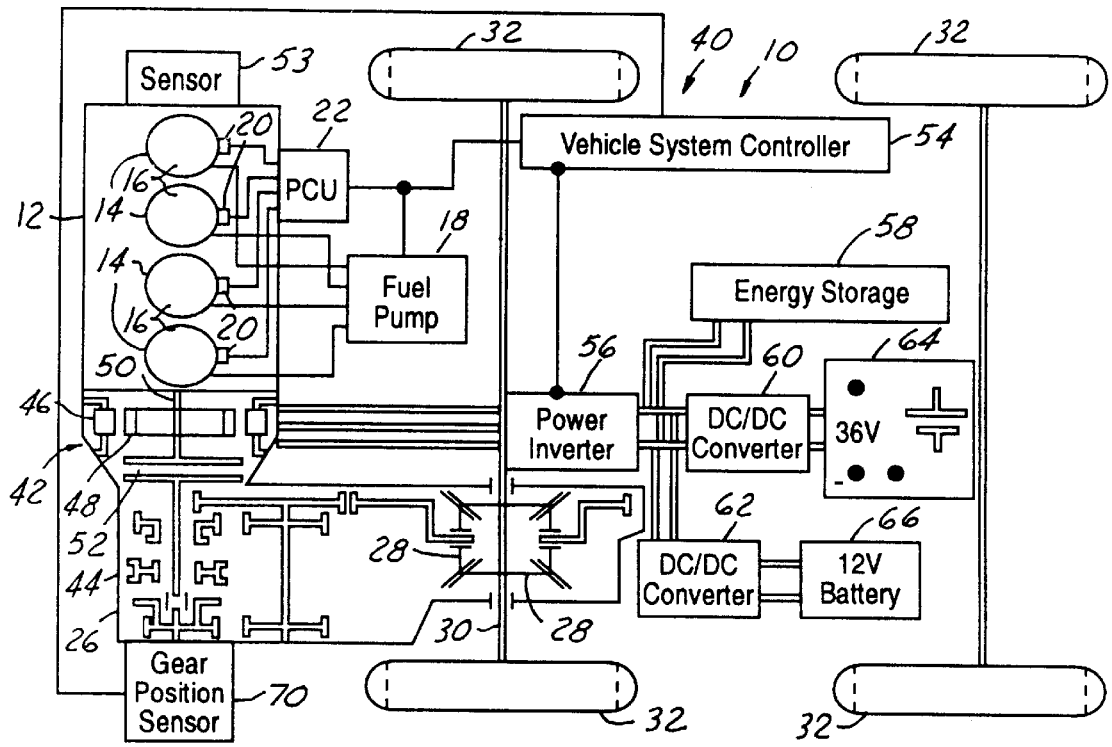
FIG. 1 is a schematic view of an automotive vehicle having a starter/alternator system according to the present invention.

Referring now to FIG. 1, an automotive vehicle 10 is illustrated having an internal combustion engine 12 with cylinders 14 with pistons 16 located therein. Each cylinder 14 is coupled to a fuel pump 18 through fuel lines and a fuel injector (not shown) or other fuel delivery system. Each cylinder 14 also has a spark plug 20 or other ignition source coupled to a powertrain control unit. A powertrain control unit 22 controls the ignition timing and fuel pump operation 18 in a conventional manner subject to the improvements of the present invention.

Engine 12 is coupled to a transmission 26. Transmission 26 may be automatic or manual. Transmission 26 is coupled to a differential 28 to drive an axle 30 to provide power to wheels 32. Of course, the present invention is also applicable to four wheel drive systems in which all of the wheels 32 are driven.

A starter/alternator system 40 that includes a starter/alternator 42 and its associated control electronics is coupled to engine 12. In the present invention, starter/alternator 42 is positioned between a housing 44 of transmission 26 and the engine 12. Starter/alternator 42 has a stator fixedly attached to bell housing 44 and a rotor 48 coupled to a crankshaft 50 of engine 12. A clutch 52 is used to engage and disengage engine 12 from transmission 26. As will be further described below, starter/alternator 42 is used as a starter (motor) during engine startup and as an alternator (generator) to supply power to recharge the batteries of the vehicle. Clutch 52 allows starter/alternator 42 to start the engine prior to engagement with the transmission 26.

Crankshaft 50 has a sensor 53 coupled thereto to determine the relative speed of the crankshaft. The torque of the engine may be derived from the crankshaft speed. Those skilled in the art would recognize various methods for determining crankshaft speeds including monitoring signals of the ignition system.

Starter/alternator system 40 has a system controller 54 that is coupled to powertrain control unit 22 and to a power inverter 56. The power inverter 56 and system controller 54 may in practice be contained in a single package. The inverter 56 is used to convert DC power to AC power in the startup mode and AC power to DC power in power in generation mode as will be further described below.

Power inverter 56 is coupled to an energy storage device 58 such as an ultra capacitor, a first DC to DC converter 60, and a second DC to DC converter 62. DC to DC converter 60 is coupled to a 36 volt battery 64. DC to DC converter 62 is coupled to a 12 volt battery 66. Of course, the actual battery voltage is dependent on the particular system to which it is attached.

A gear position sensor 70 is coupled to transmission 26. It is common for automatic transmissions to incorporate gear position sensors therein. Gear position sensor 70 generates a gear change output signal indicative of a change in gears within the transmission. A downshift gear change occurs when the accelerator pedal is depressed and rapid power increase is desired. The gear position sensor 70 is illustrated coupled to system controller 54. However, the gear position sensor 70 may also be coupled to powertrain control unit 22. The gear change output signal in this embodiment is thus coupled to the vehicle system controller 54.

Figure 2:
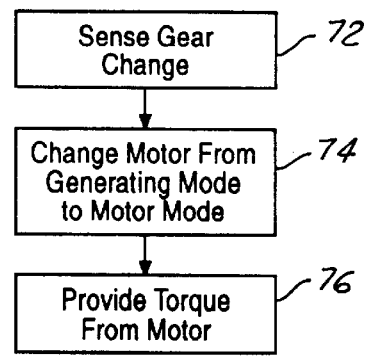
FIG. 2 is a flow chart of a system according to the present invention.

Referring now to FIG. 2, during a transmission gear change of a motor vehicle, it may be desirable to provide a greater amount of torque from engine. The present invention is particularly applicable to systems in which the engine is operating under power of the engine, then upon immediate depression of the acceleration pedal the starter/alternator is used to increase or decrease the amount of torque to help the vehicle accelerate or decelerate more rapidly.

In operation, the starter/alternator 42 has a controllable torque. The crankshaft 50 of engine 12 is rotated to a predetermined speed and with a predetermined torque to obtain a desired torque increase or decrease of the engine during gear shifting to increase or decrease acceleration. Thus, the inverter 56 of starter/alternator system 40 is capable of increasing or decreasing the torque of the starter/alternator to in turn increase or decrease the power/torque output of the engine.

At highway speeds, the engine operates the vehicle and the starter alternator operates as an generator (alternator) to charge the energy storage devices 58, 66. In the generating mode, the energy storage device 58, and batteries 64, 66 are monitored to determine whether they are fully charged. If the energy storage sources drop below a predetermined charge range, three-phase power from starter/alternator 42 is converted to 300 volts DC by power inverter 56. DC to DC converters 60, 62 are used to convert the 300 volts DC to 42 volts and 14 volts respectively. It should be noted that the ultra capacitors of energy storage 58 are charged directly by power converter 56.

When a gear is changed, such as when the accelerator pedal is depressed during a lane change maneuver, a gear shift signal from sensor 70 is provided to the controller 54. The controller senses the gear shift signal in step 72. The starter converted to a motor. Inverter 56 converts the DC power to three-phase AC power. The AC power is supplied to the stator 46 of starter/alternator 42. The starter/alternator 42 rotates rotor 48 which in turn rotates crankshaft 50 of engine 12 until the rotor of the starter/alternator and thus the engine crankshaft reaches a predetermined torque in step 24. By increasing torque, immediate acceleration of the vehicle is increased. Similarly, by decreasing torque, immediate acceleration of the vehicle can be decreased.

Advantageously, the system also reduces wear on the clutch of the system. That is, because the speed of the starter/alternator is increased during a gear change, the speed of both sides of the clutch more closely match. This reduces clutch wear because a substantial differential in speed within the clutch causes more wear as the clutch engages.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a starter/alternator coupled to the crankshaft of the engine, said method comprising the steps of:

sensing a gear shift change;

rotating the crankshaft of the engine with the starter/alternator in response to the gear shift change;

changing a torque of the starter/alternator to a predetermined torque; and thereby, changing an engine torque.

2. A method as recited in claim 1 further comprising the step of changing a vehicle acceleration in response to the step of changing an engine torque.

3. A method as recited in claim 1 wherein said step of changing a torque of the starter/alternator comprises increasing or decreasing said torque.

4. A method as recited in claim 1 wherein the step of changing an engine torque comprises increasing or decreasing said torque.

5. A system for an automotive vehicle comprising:

an internal combustion engine having a crankshaft;

a starter/alternator coupled to the crankshaft;

a transmission coupled to the starter/ alternator;

a gear position sensor coupled to the transmission generates a gear change signal;

a controller coupled to the starter/alternator and the gear position sensor for receiving the gear change signal and initiating the operation of the starter/alternator as a motor to provide a predetermined torque.

6. A system as recited in claim 5 further comprising a clutch.

7. A system as recited in claim 5 further comprising a speed sensor coupled to the crankshaft.

8. A system as recited in claim 5 wherein said controller initiates the rotation of the crankshaft to a predetermined speed.

9. A method of operating a starter/alternator comprising the steps of:

operating the starter/alternator as a alternator;

sensing a gear shift of a transmission; and switching the operation of the starter/alternator to a motor in response to sensing a gear shift.

10. A method as recited in claim 9 further comprising the step of changing engine torque in response to sensing a gear shift of the transmission.

11. A method as recited in claim 10 wherein said step of changing comprises increasing engine torque.

12. A method as recited in claim 10 wherein said step of changing comprises decreasing engine torque.

* * * * *